March 1, 1966 M. J. McINTYRE 3,237,355
GUY LINE RING FOR TOWERS
Filed July 24, 1963 3 Sheets-Sheet 1

MAURICE J. MC INTYRE
INVENTOR.
BY Seed & Berry
ATTORNEYS

March 1, 1966   M. J. McINTYRE   3,237,355
GUY LINE RING FOR TOWERS
Filed July 24, 1963   3 Sheets-Sheet 2

MAURICE J. McINTYRE
INVENTOR.

BY Seed & Berry

ATTORNEYS

March 1, 1966  M. J. McINTYRE  3,237,355
GUY LINE RING FOR TOWERS

Filed July 24, 1963  3 Sheets-Sheet 3

INVENTOR.
MAURICE J. McINTYRE
BY Seed & Berry
ATTORNEYS

United States Patent Office 3,237,355
Patented Mar. 1, 1966

3,237,355
GUY LINE RING FOR TOWERS
Maurice J. McIntyre, Sedro Woolley, Wash., assignor to The Humboldt Company, Seattle, Wash., a corporation of Washington
Filed July 24, 1963, Ser. No. 297,273
2 Claims. (Cl. 52—148)

This invention relates to improvements in equipment to be applied to portable logging towers, masts or spars for use in the attaching of guy lines or cables thereto.

More particularly, the present invention relates to the novel features of design residing in and in the mode of use of what I have herein designated to be a "guying ring" for the ready attachment of one or more guying cables or lines to the top end portion of the tower.

It is the principal object of this invention to provide a guying ring that may be readily secured to the top end portion of the tower, and which, by reason of its particular design, mode of application and securement is practical and has exceptional and adequate strength for its particular use; that is equipped for the ready and secure application of a plurality of guy line sheave blocks thereto for the adjustable carrying of guying lines radiating from the tower.

It is a further object of this invention to provide a guying ring in accordance with the above stated objects; that can be so applied to the logging tower as not to interfere with the extending of cables, as usually used in the logging operation, upwardly through the tower structure and through a fairleader mounting stem, as fixed in its upper end, to carry the main line, sky line and the like used in the operation.

Further objects and advantages of the invention reside in the specific details of construction of the guying ring and in those parts and devices directly associated therewith for making the guy line block connections.

In accomplishing the above mentioned and other objects of the invention, I have provided the improved details of construction, the preferred forms of which are illustrated in the accompanying drawings, wherein—

Figure 1:
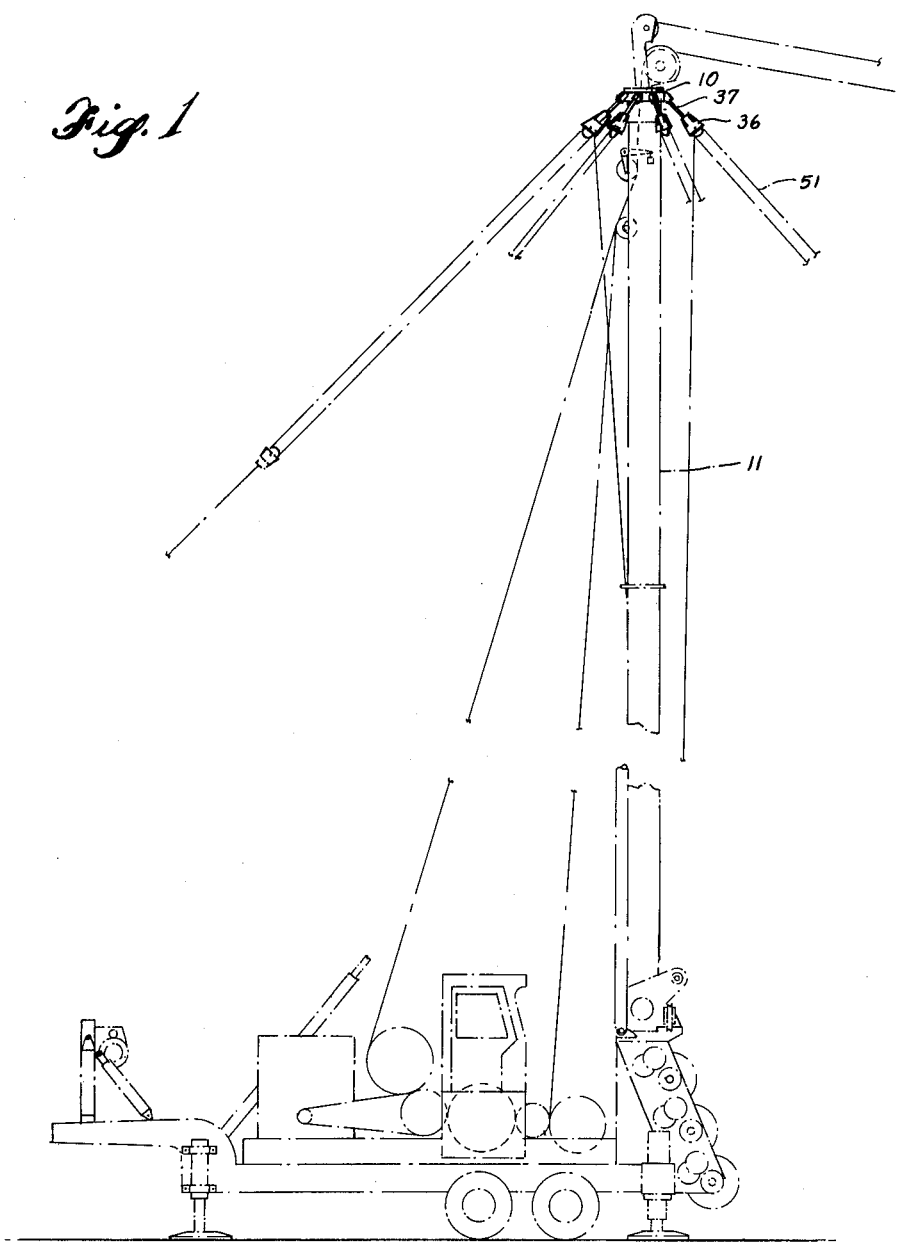
FIG. 1 is a side elevation of a portable spar or tower equipped with the guying ring of the present invention.
Figure 2:
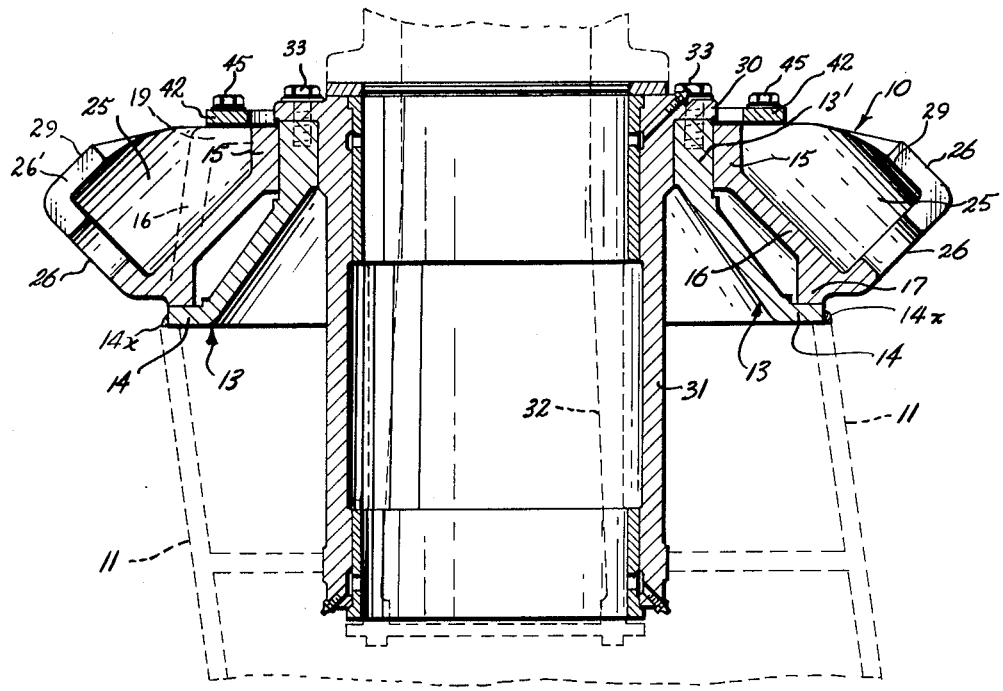
FIG. 2 is a vertical, cross sectional view, taken diametrically of the present guying ring, as functionally secured on the upper end of a logging tower.

Referring more in detail to the drawings:

In FIG. 1 I have shown the present guying ring 10 as mounted for use on the upper end portion of a portable logging spar or tower which is designated in its entirety by numeral 11. The guying ring 10 is best shown in FIG. 2 as being applied about the top end collar portion 13' of a ring mounting base member 13 that is conically downwardly flared to terminate in a horizontal base flange 14 that rests upon and is welded, as at 14x, or otherwise permanently secured, to the top end structure of the tower 11. As here illustrated the tower may be a metal bar fabrication or of other suitable construction.

The outer side and top surface of the collar portion 13' of the ring mounting base member 13, and also the top surface of flange 14 are machined to insure a firm and close, but rotatable fit of the guying ring 10 on the base member 13, as has been shown in FIG. 2.

Figure 3:
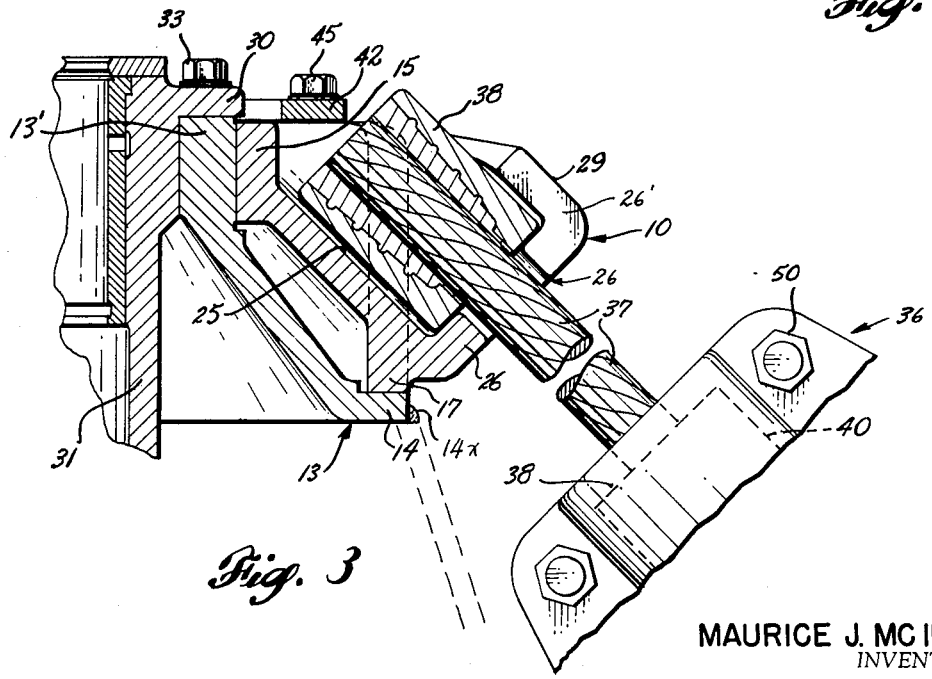
FIG. 3 is a vertical, sectional view of a portion of the present guying ring, showing one end portion of a block attaching cable as applied to the ring.

The guying ring 10 is of the cross-sectional formation well shown in FIG. 3. It is best shown in FIGS. 2 and 3, to be formed about the top portion of its inner periphery with a collar 15 that is machined to closely but rotatably fit about the top collar portion 13' of the mounting base member 13, and with an outwardly and downwardly sloping base wall portion 16 that terminates in a shoulder 17. This shoulder is machined to rest flatly on the top surface of the flange 14 of the mounting base member 13. The ring 10 also embodies, as an integral part thereof, see FIG. 5, a top wall 19 which extends from the top of wall 16 and horizontally and directly inward to join with the collar 15. Wall 19 is vertically drilled and tapped as at 20 in FIG. 5 to receive anchor bolts, for a purpose presently disclosed.

Figure 4:
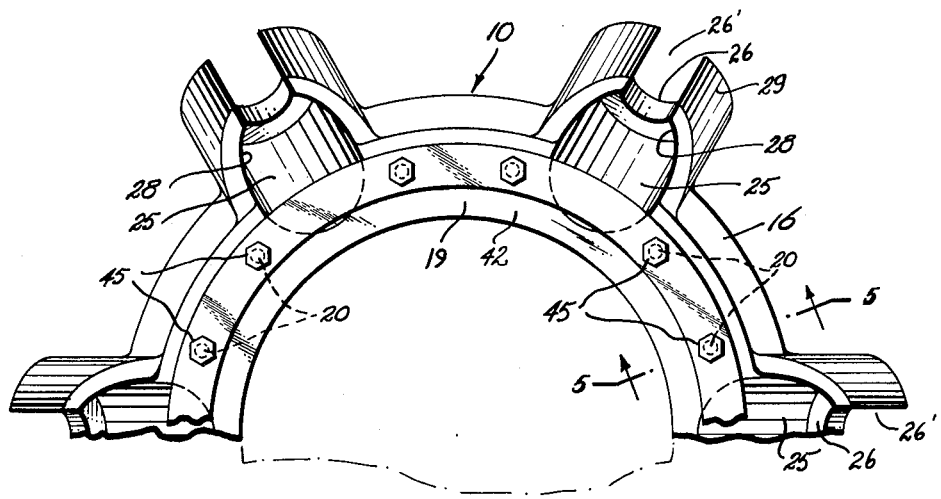
FIG. 4 is a partial top or plan view of the guying ring.

It is an important feature of the construction of ring 10 that, at predetermined intervals of angular spacing, it is provided, as best shown in FIG. 4, with cylindrical, integrally cast sockets 25, that are downwardly and outwardly inclined as in FIG. 3, in accordance with the outward slope of the mounting ring 13. Each socket 25 is closed at its lower end by an integral end wall 26 formed with an upwardly directed central slot 26' of lesser width than the socket, for receiving the knob equipped end portion of one of the sheave block attaching cables therein. The upper end of each socket 25 terminates at the collar 15 and each socket is provided with a side opening 28 equal in width to the full width of the socket but terminating short of the closing wall 26; this top opening 25 being defined across its lower end by a wall portion 29 serving as a ferrule retaining member, as presently understood. The slot 26' as formed in end wall 26 continues through top wall portion 29. As here shown, the ring 10 is provided with eight sockets 25 at equal angular intervals of spacings thereabout.

After the annular base member 13 has been applied to and fixed to the top end of the tower, and the guying ring 10 fitted thereon, as shown in FIG. 2, it is secured against displacement from position in any suitable manner. In the present instance, it is held against upward displacement by the slight overlapping therewith of an annular flange 30 that is formed about the top end portion of a tubular bearing sleeve 31 that is disposed and secured axially in the top end portion of the ring mounting base member 13.

The sleeve 31 serves as a supporting guide for the tubular mounting stem 32 of a fairleader block, not shown, over which the main line or sky line of the logging operation, passing upwardly through the tower, may be extended. It will be noted by reference to FIG. 1 that the flange 30 receives bolts 33 therethrough for fixed securement of the sleeve 31 to the collar 13' of the mounting base member 13.

Figure 5:
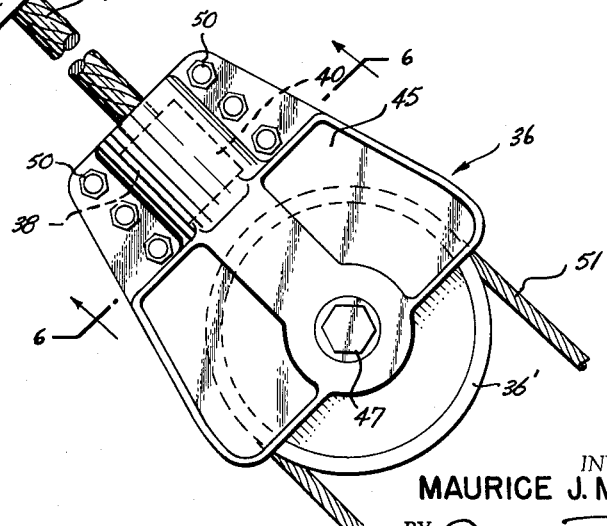
FIG. 5 is a sectional detail of the guying ring and an attached block carrying a guying line.

For the connection of guy lines to the guying ring 10 there is provided for each line connection, a sheave block 36 in which at its outer end, a sheave wheel 36' is rotatably mounted. Each sheave block 33 is secured for use to the ring 10 by a short length of cable 37 as shown in FIG. 5. For making these connections, each length of cable 37 is equipped at each of its opposite ends with a collar or ferrule 38. The ferruled outer end of each connecting cable 37 is applied to and secured in a socket 40 formed in the base end portion of the sheave block 36 that is to receive the corresponding guying line, and the ferruled inner end portion of the cable is laid through the lower end slot 26' of and is seated in the corresponding socket 25 of the guying ring 10; each connection between ring 10 and block 36 when completed, being as shown in FIG. 5. After all inner end ferrules have been seated in the sockets 25 of ring 10, then an annular ferrule retaining strap 42 is applied to the top wall 19 of the ring 10 to pass over the inner end portions of all ferrules 38 as seated in the sockets 25. This retainer strap is then secured by bolts 45 passed downwardly through it and threaded into the holes 20 previously mentioned as being formed in the top wall 19 of the ring 10.

Figure 6:
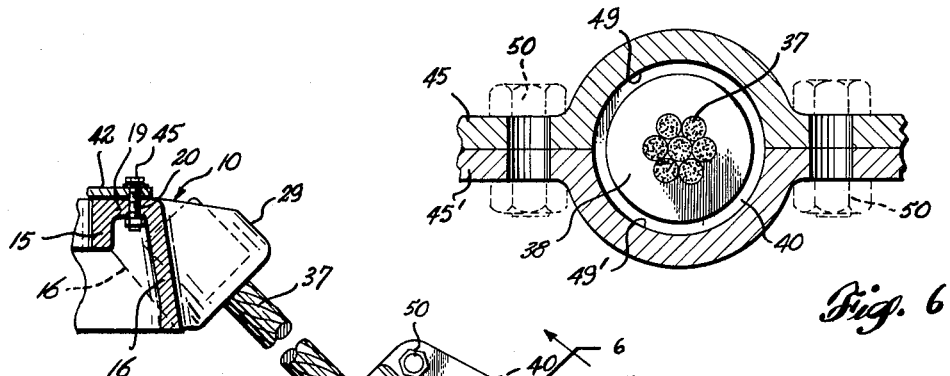
FIG. 6 is a sectional detail taken on line 6—6 in FIG. 5 illustrating the block frame construction.

A feature of construction of each of the sheave blocks 25 resides in its formation from complemental opposite side plates 45 and 45' that support a sheave wheel 36' between them for rotation on an axle or shaft 47. At their inner ends, these plates are formed with cooperating semi-cylindrical pockets 49–49' as in FIG. 6 that meet in registration and together provide a cylindrical socket 40 for receiving and retaining the outer ferrule equipped end portion of a block attaching cable 37. The two side plates 45–45' when assembled are securely clamped together by bolts 50 applied through the plate flanges at opposite sides of the socket 40.

With the sheave blocks 36 so attached to the guying ring, guying cables 51 may be applied to the sheaves of the blocks and one end of each extended therefrom for its attachment to an anchoring element and its other end may be extended downwardly and applied about a line tightening drum, usually associated with the logging tower at its base end as indicated in FIG. 1 for adjustably tensioning the guy line. With the guying ring 10 so applied to the top end of the logging tower or spar 11, and the guy line blocks 36 properly attached to the ring and the guying cables applied over the block sheaves 36' as indicated, it is apparent that the spar may be securely guyed for use without any interference of the guying ring with any of the cables or lines that may be used therewith in the usual logging operations.

The particular formation of the ring 10 gives it unusual and sufficient strength to withstand the strain to which it is subjected by the plurality of the guying cables usually employed for guying the tower. When it is desired to detach the cable blocks from the tower, the ferrule retaining strap 42 is removed from the ring and the ferruled ends of the attaching cables 37 removed from the sockets 25.

What I claim is:
1. In combination, a portable steel logging tower, a plurality of tower guying cables and a plurality of cable attaching means for releasably securing each of said guying cables to the upper end of said tower, said tower including a horizontally disposed annular base member, a guying ring rotatably disposed on said annular base member, said guying ring including a plurality of inwardly and upwardly opening sockets at spaced intervals about the periphery thereof, a continuous cable passing slot formed in the side wall and base of each of said sockets, said cable attaching means including a relatively short length of steel cable, a ferrule secured to at least one end of said cable, said ferrule being removably seatable in one of said sockets, a cable sheave block secured to the other end of said cable, a retaining ring secured to said guying ring across the open end of said sockets to retain the ferrules in said sockets.

2. In combination as in claim 1 wherein said short cable has ferrules secured to both ends thereof and said cable sheave block includes a ferrule receiving socket.

References Cited by the Examiner
UNITED STATES PATENTS

| | | | |
|---|---|---|---|
| 2,582,548 | 1/1952 | Larson | 52—120 |
| 2,658,776 | 11/1953 | Wilcox | 52—655 |
| 2,803,486 | 8/1957 | Larson et al. | 294—78 |
| 2,828,519 | 4/1958 | Berg | 24—123 |

FRANK L. ABBOTT, *Primary Examiner.*

RICHARD W. COOKE, JR., *Examiner.*